United States Patent
Nishikawa

(10) Patent No.: US 6,665,242 B2
(45) Date of Patent: Dec. 16, 2003

(54) OPTICAL INFORMATION REPRODUCING APPARATUS HAVING CIRCUIT FOR ADJUSTING REPRODUCING POWER

(75) Inventor: Koichiro Nishikawa, Takasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 324 days.

(21) Appl. No.: 09/725,801

(22) Filed: Nov. 30, 2000

(65) Prior Publication Data

US 2001/0005340 A1 Jun. 28, 2001

(30) Foreign Application Priority Data

Dec. 2, 1999 (JP) .......................... 11-343593
Dec. 2, 1999 (JP) .......................... 11-343594

(51) Int. Cl.$^7$ .............................. G11B 5/09
(52) U.S. Cl. ...................... 369/47.5; 369/116
(58) Field of Search ................. 369/47.5, 116, 369/44.13, 44.26, 13.49, 13.41, 13.08, 53.31, 124.12

(56) References Cited

U.S. PATENT DOCUMENTS

| | | | |
|---|---|---|---|
| 5,448,548 A | * 9/1995 | Taneya et al. | .............. 369/121 |
| 5,459,706 A | * 10/1995 | Ogawa et al. | ........... 369/53.31 |
| 5,521,897 A | 5/1996 | Nishikawa | ................ 369/116 |
| 5,596,555 A | * 1/1997 | Osato et al. | ............. 369/13.49 |
| 5,617,400 A | 4/1997 | Fuji | ........................ 369/116 |
| 5,671,199 A | 9/1997 | Nishikawa | .............. 369/44.26 |
| 6,027,825 A | 2/2000 | Shiratori et al. | ........... 428/694 |
| 6,122,229 A | * 9/2000 | Yonezawa | ............... 369/13.08 |
| 6,261,707 B1 | * 7/2001 | Murakami et al. | ... 428/694 ML |

FOREIGN PATENT DOCUMENTS

| JP | 6-290496 | 10/1994 |
|---|---|---|
| JP | 8-63817 | 3/1996 |

* cited by examiner

Primary Examiner—William Korzuch
Assistant Examiner—Kim-Kwok Chu
(74) Attorney, Agent, or Firm—Fitzpatrick, Cella, Harper & Scinto

(57) ABSTRACT

An optical information reproducing apparatus for reproducing information by irradiating a recording medium with a reproducing light beam includes a light source for generating the reproducing light beam, a reproducing circuit for reproducing a reproduction signal by using the light beam, and an adjusting circuit for adjusting the light beam power. The adjusting circuit adjusts the beam power to a value larger than the light beam power at which a value obtained by normalizing the reproduction signal with the beam power is maximized.

6 Claims, 4 Drawing Sheets

$Pr1 = \alpha \times Pr0$
$\alpha > 1.0$
Pr1; REPRODUCING POWER SET

Pr1; REPRODUCING POWER SET
WHEN C INCREASES BY ΔC/Pr1, INCREASES Pr1 BY ΔPr1.
WHEN C DECREASES BY ΔC/Pr2, DECREASES Pr1 BY ΔPr2.

OPTICAL INFORMATION REPRODUCING APPARATUS HAVING CIRCUIT FOR ADJUSTING REPRODUCING POWER

BACKGROUND OF THE INVENTION

1. Field of the Invention

The present invention relates to an optical information reproducing apparatus for reproducing recorded information on an information recording medium such as an optical disk and, more particularly, to an optical information reproducing apparatus optimal for a DWDD (Domain Wall Displacement Detection) scheme.

2. Related Background Art

Recently, with the widespread use of networks, digital cameras, digital video device, and the like, the occasion to handle image data has greatly increased in number, and hence strong demands have arisen for media and apparatuses suited for recording/reproducing moving image data, in particular. Research and development on such media and apparatuses have been vigorously pursed. Of these media and apparatuses, in the field of optical disks, an optical disk and optical disk apparatus have been enthusiastically studied and developed, which are suited for handling digital moving image data. Such a large-capacity optical disk and optical disk apparatus, for example, those based on the domain wall displacement detection scheme disclosed in Japanese Patent Application Laid-open No. 6-290496 are available.

As disclosed in this reference, the domain wall displacement detection scheme is a scheme of irradiating a medium with a beam spot to form a temperature gradient on the medium so as to move a domain wall forming a minute mark, which cannot be resolved with the resolution of an optical head, thereby enlarging the mark in the direction of track moving and reproducing information. By using this domain wall displacement detection scheme, an unprecedented large-capacity system can be built. Reproducing schemes using the magnetic super resolution technique, as well as the domain wall displacement detection scheme, use a temperature distribution on a medium, and hence their characteristics depend on reproducing power, in particular.

While, Japanese Patent Application Laid-open No. 8-63817 discloses a method for a super resolution magneto-optical disk (magnetic super resolution optical disk) apparatus for reproducing a minute mark by using a detection window formed by a temperature distribution on a recording medium. In this method, long and short marks are reproduced in advance, and the amplitude ratio between a long mark reproduction signal level and a short mark reproduction signal level at which jitter is minimized is obtained as a reference value in advance. A reproducing power is then set in accordance with this reference value. According to this reference, a plurality of reproducing power setting regions on which predetermined control data (long and short marks for amplitude ratio calculation) are recorded are formed on a disk, and a reproducing power is set by reading control data from the reproducing power setting regions near reproduction regions.

However, in the above conventional domain wall displacement detection scheme, the magnitude of a reproduction signal is determined by almost instantaneous displacement of the domain wall, and hence the mark length dependence of a signal level is very low. In the domain wall displacement detection scheme, therefore, a large change in amplitude ratio cannot be obtained. For this reason, if the method of setting a reproducing power with reference to the amplitude ratio between a long mark reproduction signal level and a short mark reproduction signal level, disclosed in Japanese Patent Application Laid-open No. 8-63817, is used for the domain wall displacement detection scheme, a reproducing power cannot be accurately set. In addition, setting, on a disk, a plurality of reproducing power regions on which control data is recorded in advance will lead to a capacity loss. Assume that reproducing power setting regions are used for reproducing power control. In the case of a magnetic super resolution optical disk, since a minute mark is detected by using a temperature distribution on the medium, this technique is very sensitive to a reproducing power. Therefore, frequent access to the reproducing power setting regions occurs, resulting in a time loss.

SUMMARY OF THE INVENTION

The present invention has been made in consideration of the above problems in the prior art, and has as its object to provide an optical information reproducing apparatus which can accurately set a reproducing power even if an information recording medium using a magnetic super resolution technique that is very sensitive to a reproducing power is used, and is free from any capacity loss and time loss.

In order to achieve the above object, there is provided an optical information reproducing apparatus for reproducing information by irradiating a recording medium with a reproducing light beam, comprising:

a light source for generating the reproducing light beam;

a reproducing circuit for reproducing a reproduction signal by using the light beam; and an adjusting circuit for adjusting the light beam power, wherein the adjusting circuit adjusts the beam power to a value larger than the light beam power at which a value obtained by normalizing the reproduction signal with the beam power is maximized.

DETAILED DESCRIPTION OF THE PREFERRED EMBODIMENT

An embodiment of the present invention will be described below. The principle of the present invention will be described first. The domain wall displacement detection scheme will be exemplified as a super resolution reproducing scheme, which reproduces a minute mark by displacing a domain wall of a mark. A recording medium designed to reproduce information by displacing such a domain wall will be referred to as a domain wall displacement type medium hereinafter. The domain wall displacement detection scheme is disclosed in Japanese Patent Application Laid-open No. 6-290496, and hence will be described briefly. As disclosed in this reference, a domain wall displacement type medium is made up of at least first, second, and third magnetic layers. The first magnetic layer is a perpendicular magnetic film having a smaller domain wall coercivity and higher domain wall mobility than the third magnetic layer at a temperature near the ambient temperature. That is, the first magnetic layer is a layer on which a domain wall is displaced. The second magnetic layer is formed by a magnetic layer having a lower Curie temperature than the first and third magnetic layers. The third magnetic layer is a perpendicular magnetic film. The third magnetic layer stores information. Note that the tracks on the recording medium are magnetically isolated from each other, and no domain walls are formed between the tracks.

By irradiating this recording medium with a reproducing beam spot, a minute mark is reproduced. More specifically, the exchange coupling between the first and second magnetic layers is broken at a temperature Ts near the Curie temperature of the second magnetic layer by the temperature distribution formed by the application of the beam spot on the recording medium, and the domain wall of the first magnetic layer is displaced to a high-temperature side, up to the peak position of the above temperature distribution. As a consequence, the minute mark is enlarged, and information is reproduced by detecting a change in the polarization plane of reflected light from the enlarged mark. This makes it possible to reproduce a minute mark that cannot be resolved with the resolution of an optical head, thus allowing the construction of a large-capacity optical disk system.

Figure 1:
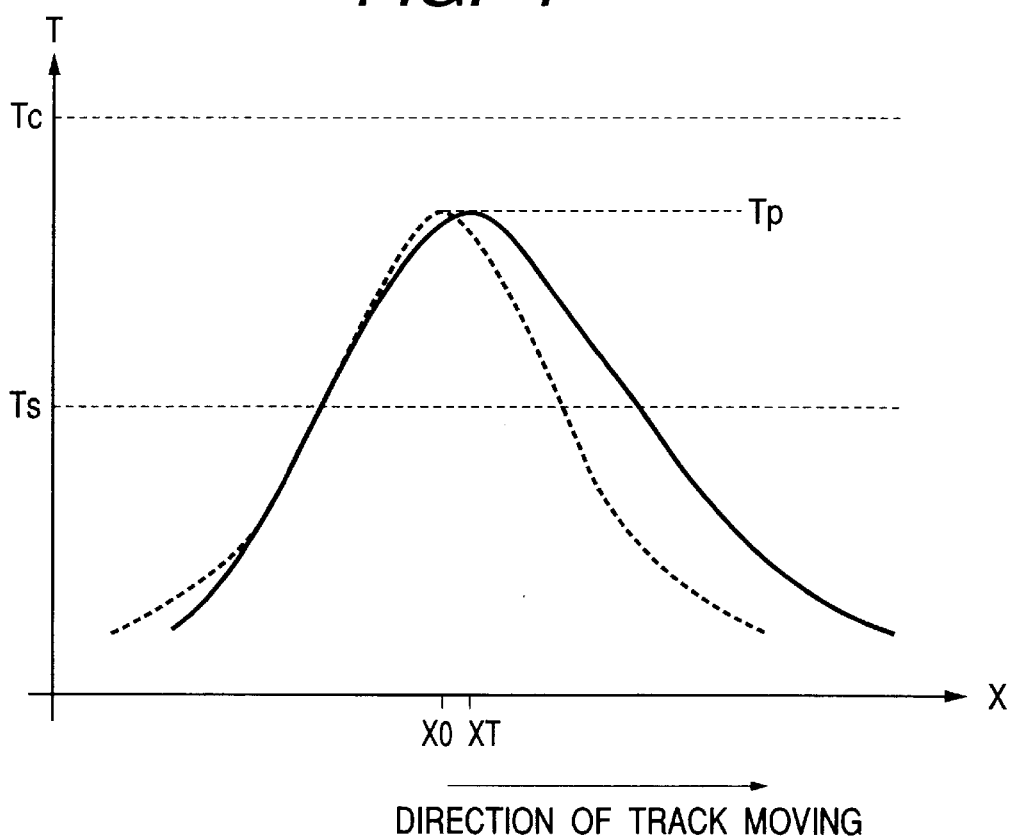
FIG. 1 is a graph showing a temperature distribution on a medium and the intensity of a beam spot when a domain wall displacement type medium is used to reproduce information.

FIG. 1 is a graph showing a temperature distribution and beam spot intensity distribution on the domain wall displacement type medium. The solid line represents the temperature distribution; and the dotted line, the beam spot intensity distribution. The beam spot intensity distribution has a peak position X0. The temperature distribution has a temperature peak Tp whose position is indicated by a coordinate XT in the direction of track moving. The first magnetic layer has a Curie temperature Tc. Assume that a reproducing signal is used to reproduce a minute mark that exceeds the normal resolution of an optical system for reproducing information. In this case, when the reproducing power increases to make the temperature peak value exceed the Curie temperature of the second magnetic layer, and domain wall displacement starts, the signal level abruptly rises. In addition, as the reproducing power increases, the medium temperature of a region where the domain wall is displaced, especially a temperature near the temperature peak, approaches the Curie temperature of the first magnetic layer (displacement layer). As the reproducing power further increases, the temperature of part of the region exceeds the Curie temperature, and the signal level decreases.

Figure 2:
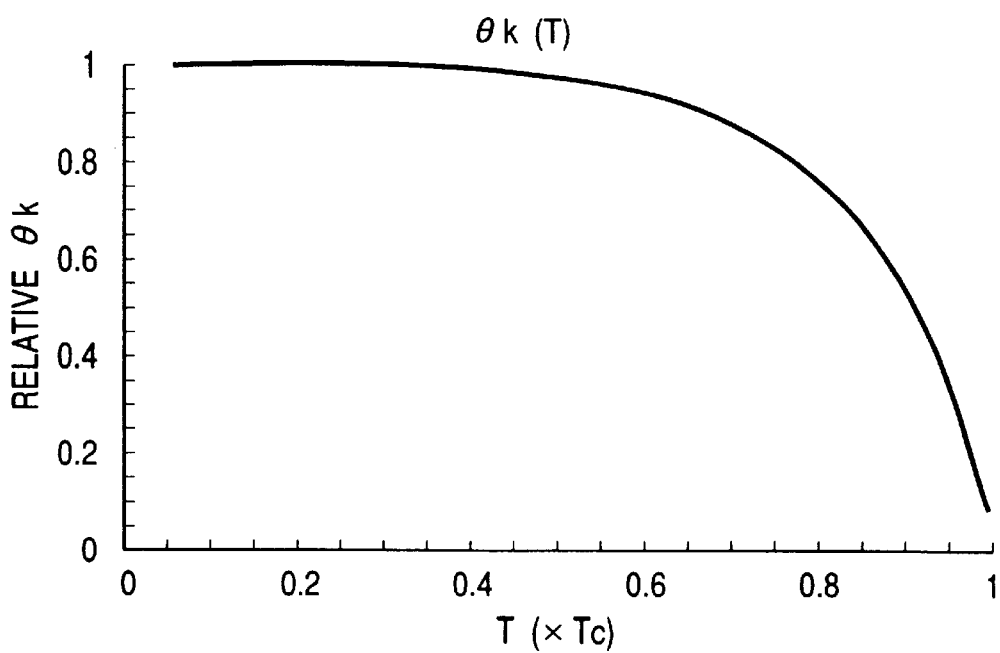
FIG. 2 is a graph showing the temperature dependence of the Kerr rotation angle of the first magnetic layer of the domain wall displacement type medium.

FIG. 2 is a graph showing the temperature dependence of the Kerr rotation angle of the first magnetic layer. The ordinate represents the relative Kerr rotation angle; and the abscissa, the temperature. T=0 corresponds to room temperature; and T=1, the Curie temperature of the first magnetic layer. As is obvious from FIG. 2, the Kerr rotation angle abruptly decreases at a temperature near the Curie temperature of the first magnetic layer. Near the temperature peak, therefore, the temperature of the first magnetic layer relatively approaches the Curie temperature Tc, and hence the Kerr rotation angle decreases due to its temperature dependence. If the reproducing power increases and the temperature exceeds the Curie temperature, the Kerr rotation angle in the corresponding region becomes zero. As a consequence, as the temperature peak Tp approaches the Curie temperature Tc, even if the reproducing power increases, since this increase is canceled out by a decrease in Kerr rotation angle due to the temperature dependence, the signal level does not increase, and the reproducing power starts to decrease at a given reproducing power.

Noise from the domain wall displacement type medium increases with an increase in reproducing power. As the peak temperature of the temperature distribution exceeds Ts to start domain wall displacement, and the domain wall displacement progresses in the region, the noise decreases. When the reproducing power increases to the extent that recording is started (the peak temperature becomes nearly the Curie temperature of the third magnetic layer), the noise begins to increase again.

Figure 3:
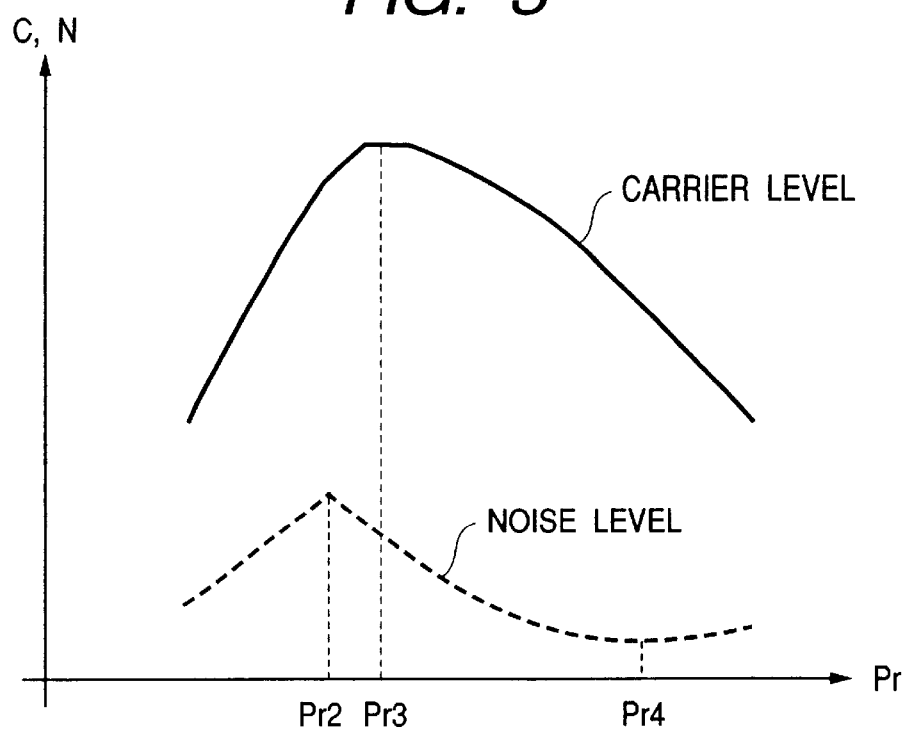
FIG. 3 is a graph showing the reproducing power dependence of a carrier level and noise level when the domain wall displacement type medium is used.

FIG. 3 is a graph showing a signal level and the reproducing power dependence of noise. The ordinate represents the signal level (carrier level C) and noise level N; and the abscissa, the reproducing power. The solid line represents the carrier level C; and the dotted line, the noise level N. As the reproducing power increases, the noise level reaches its peak at a reproducing power Pr2. The carrier level C reaches its peak at a reproducing power Pr3. The reproducing power exceeds the reproducing power Pr2 again, the noise level decreases. When the reproducing power exceeds a reproducing power Pr3, the carrier level begins to decrease. At a reproducing power Pr4, the noise level begins to increase again.

In the domain wall displacement type medium, as the reproducing power shifts from Pr3 to Pr4, the reduction ratio of noise level become higher toward Pr3. As the reproducing power increases and approaches Pr4, the reduction ratio of carrier level exceeds the reduction ratio of noise level. Obviously, therefore, there is a point between the reproducing powers Pr3 and Pr4 at which the ratio of noise level to carrier level is minimized. The reproducing power at this point is represented by Pr1. The reproducing power Pr3 corresponds to the point where an increase in signal level due to an increase in reproducing power almost perfectly cancels out a decrease in signal level due to the temperature dependence of the Kerr rotation angle. Letting Pr0 be the reproducing power at which the signal level normalized with the reproducing power is maximized, Pr0<Pr3<Pr4 is satisfied.

Figure 4:
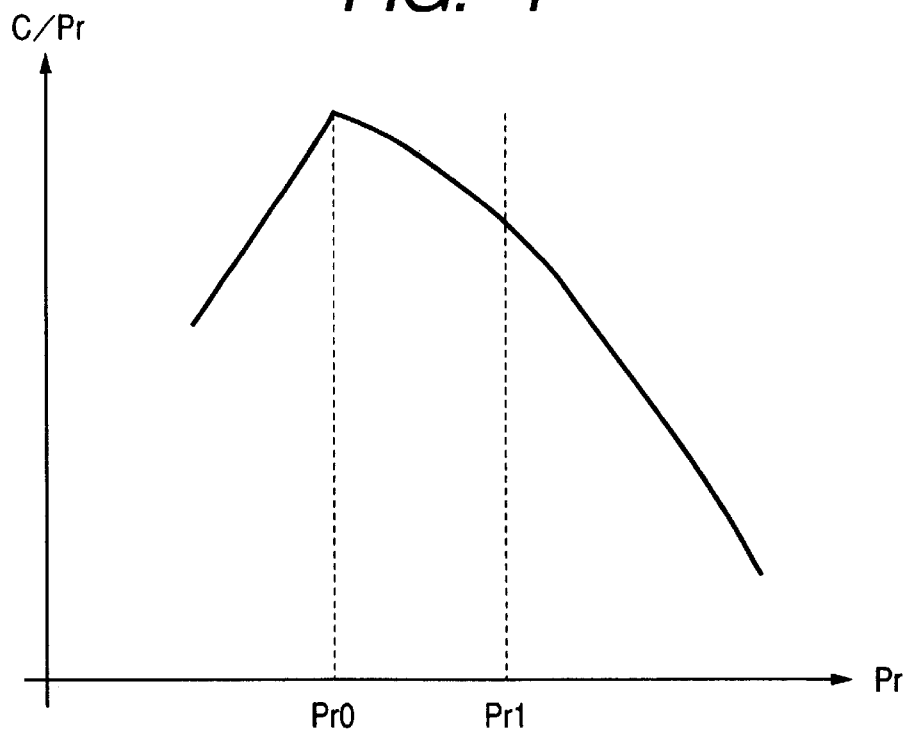
FIG. 4 is a graph for explaining the principle of setting a reproducing power.

In the present invention, based on this principle, a reproducing power Pr1 is set as a value larger than the reproducing power at which the signal level normalized with the reproducing power is maximized, and reproducing power control is performed to hold this reproducing power. The reproducing power Pr1 is given by Pr1≈1.4×Pr0. Referring to FIG. 4, the abscissa represents the reproducing power; and ordinate, the carrier level normalized with the reproducing power. At the reproducing power Pr0, the signal level normalized with the reproducing power rises to a maximum value. The reproducing power Pr1 is a reproducing power set.

Figure 5:
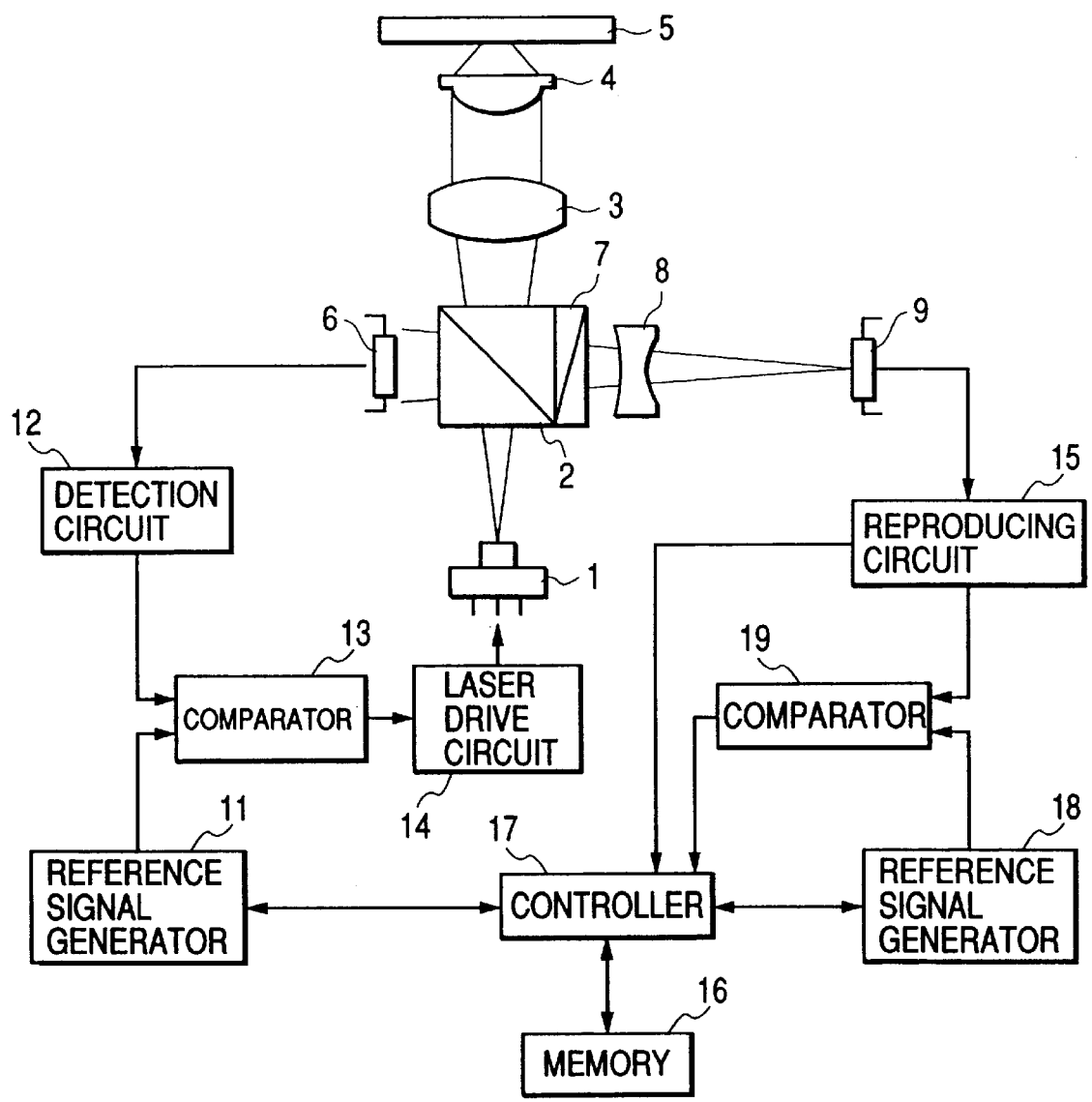
FIG. 5 is a view showing the arrangement of an embodiment of the present invention.

An embodiment of the present invention will be described on the basis of the above principle. FIG. 5 is a view showing the arrangement of this embodiment of the present invention. Referring to FIG. 5, a semiconductor laser 1 is used as a recording/reproducing light source. A laser beam emitted from the semiconductor laser 1 passes through a polarizing beam splitter 2 and is collimated by a collimator lens 3. The collimated light is incident an objective lens 4. This incident light is focused by the objective lens 4 to strike as a minute beam spot a magneto-optical medium 5. As the magneto-optical medium 5, a domain wall displacement type medium is used. The domain wall of a mark recorded on the medium 5 is displaced to enlarge the mark, thus reproducing the recorded information. The reflected light from the magneto-optical medium 5 strikes the polarizing beam splitter 2 again through the objective lens 4 and collimator lens 3. The polarizing beam splitter 2 splits the reflected light from the medium 5 from the incident light from the semiconductor laser 1, and reflects it toward a Wollaston prism 7. This reflected light is detected by a signal sensor 9 through the Wollaston prism 7 and a sensor lens 8. The detection signal obtained by the signal sensor 9 is output to a reproducing circuit 15 and is reproduced as a magneto-optical signal.

Part of the laser beam from the semiconductor laser 1 is detected by a monitor sensor 6 and detected by a detection circuit 12 as a voltage signal. A comparator 13 compares the detection signal obtained by the detection circuit 12 with a reference signal from a reference signal generator 11, and outputs a signal corresponding to the difference to a laser driver circuit 14. That is, the difference signal between the detection signal and the reference signal is fed back to the laser driver circuit 14 to set a reproducing power for the semiconductor laser 1 such that the reference signal becomes equal to the detection signal. More specifically, the reference signal from the reference signal generator 11 is sequentially changed, and the optical material signal amplitude output from the reproducing circuit 15 every time the reference signal is changed is detected. The optical material signal from the reproducing circuit 15 is received by a controller 17 through an A/D converter (not shown). The controller 17 stores the reference signal and the ratio of the optical material signal amplitude to the reference signal (optical material signal amplitude/reference signal) in a memory 16. The controller 17 detects a reference signal by which the ratio of the magneto-optical signal amplitude to the reference signal rises to a maximum value from the signals stored in the memory 16, and determines the detected signal as a reference signal Vm.

Figure 6:
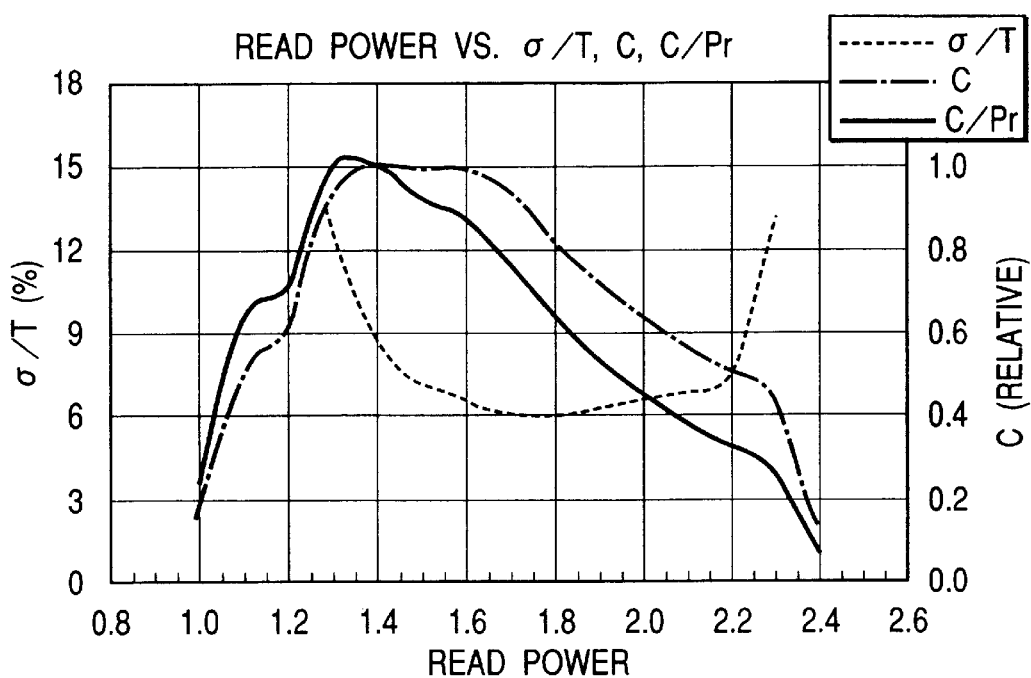
FIG. 6 is a graph showing measurement results for determining $\alpha$ in the embodiment in FIG. 5.

The controller 17 then multiplies the reference signal Vm from the reference signal generator 11 by a predetermined value α to set a reproducing power α·Vm for the semiconductor laser. In this embodiment, α=1.4, as described above. That is, the controller 17 sets the optical output of the semiconductor laser 1 to be 1.4 times the laser output when the reference signal is Vm. The value of α is experimentally determined. FIG. 6 shows the measurement results of the carrier level C and jitter σ with respect to the reproducing power under the following measurement conditions. A domain wall displacement type medium is used, the mark length is set to 0.15 μm, the linear velocity is set to 1.5 m/s, the NA of the optical system is set to 0.55, and the wavelength of the semiconductor laser 1 is set to 680 nm. Referring to FIG. 6, the ordinate represents σ/T (dotted line) where T is the time corresponding to a mark length of 0.15 μm and σ is the jitter value, the carrier level C (chain line), and a carrier level C/Pr (solid line) normalized with the reproducing power.

As is obvious from FIG. 6, the reproducing power at which the carrier level C/Pr normalized with the reproducing power rises to a maximum value is about 1.3 mW, and the reproducing power at which α/T decreases to a minimum value (i.e., the maximum performance of the medium can be obtained) is about 1.8 mW. Therefore, α=1.8/1.3≈1.38. In an experiment, α≈1.4 was obtained as an optimal value. In addition, obviously from FIG. 6, if the jitter value is permitted to increase by 3% with respect to a detection window width (the time corresponding to a mark length of 0.15 μm), the performance can be maintained with α=1.1 to 1.6. Therefore, a reproducing power can be set near a point where the ratio between the carrier level and the noise level rises to a maximum value (corresponding to a point where the jitter values decreases to a minimum value), and the maximum performance of the medium can be obtained.

In this case, since the signal level of a reproduction signal in the domain wall displacement detection scheme has no mark length dependence as described above, a target signal, whose carrier level is detected in setting a reproducing power, is not limited to a signal level corresponding to a mark length in determining α. This target may be the envelope width of signals that have already been recorded on the magneto-optical medium 5.

Reproducing power control after a reproducing power is set will be described next. Setting a reproducing power to an optimal value amounts to setting the ratio of a domain wall displacement region in a reproducing beam spot. If, therefore, the carrier level C/Pr normalized with a reproducing power is kept to the value set when the reproducing power is set, the ratio of the domain wall displacement region in the beam spot can be kept constant. This makes it possible to always obtain the maximum performance of the medium. In this embodiment, therefore, reproducing power control is performed to keep the carrier level C/Pr, normalized with a reproducing power, constant.

More specifically, after a reproducing power is set for the semiconductor laser 1, the controller 17 controls a reference signal generator 18 to generate a reference signal $S_o$, which represents an magneto-optical signal amplitude corresponding to the reproducing power set. During reproducing of information from the magneto-optical medium 5, a comparator 19 monitors the magneto-optical signal amplitude from the reproducing circuit 15 and compares it with the reference signal $S_0$ from the reference signal generator 18. When the difference between the magneto-optical signal amplitude and the reference signal $S_0$ exceeds a predetermined level, the controller 17 changes the reference signal Vm from the reference signal generator 11 by ΔVm, and controls the comparator 13 and laser driver circuit 14 to change the optical output of the semiconductor laser 1 accordingly.

When the optical output of the semiconductor laser 1 changes, the denominator of the carrier level C/Pr normalized with the reproducing power also changes. If, therefore, Vm changes to Vm+ΔVm, the optimal magneto-optical signal amplitude changes from $S_0$ to $S_0 \times (Vm+(\Delta Vm/Vm))$= S0'. The controller 17 then changes the reference signal Vm from the reference signal generator 11 by ΔVm, and at the same time, set the reference value from the reference signal generator 18 to $S_0'$. The comparator 19 monitors the magneto-optical signal amplitude from the reproducing circuit 15 and compares it with the reference signal $S_0'$. Control similar to that described above is then performed. If the reproducing power increases at the reproducing power set position, the temperature near the beam spot on the medium rises, and the magneto-optical signal level decreases, as described above. In this case, therefore, the reference signal from the reference signal generator 11 is decreased in level to decrease the reproducing power of the semiconductor laser 1. If, for example, the magneto-optical signal level decreases due to, for example, an increase in temperature on the medium with an increase in ambient temperature, it is regarded that the reproducing power relatively increases. Hence, the reproducing power is decreased. As a consequence, the temperature on the medium decreases, and hence the magneto-optical signal level is restored.

As the reproducing power decreases at the reproducing power set position, the temperature near the beam spot on the medium decreases, and the magneto-optical signal level increases. When the magneto-optical signal level increases, it is regarded that the reproducing power relatively decreases. In this case, the reference signal is increased in level to increase the reproducing power of the semiconductor laser 1. As a consequence, the temperature on the medium increases, and hence the magneto-optical signal level is restored. Assume that as a magneto-optical signal level, the envelope width of signals that are actually reproduced is used. In this embodiment, the carrier level C/Pr normalized with a reproducing power can always be kept constant by controlling the reproducing power in real time.

Figure 7:
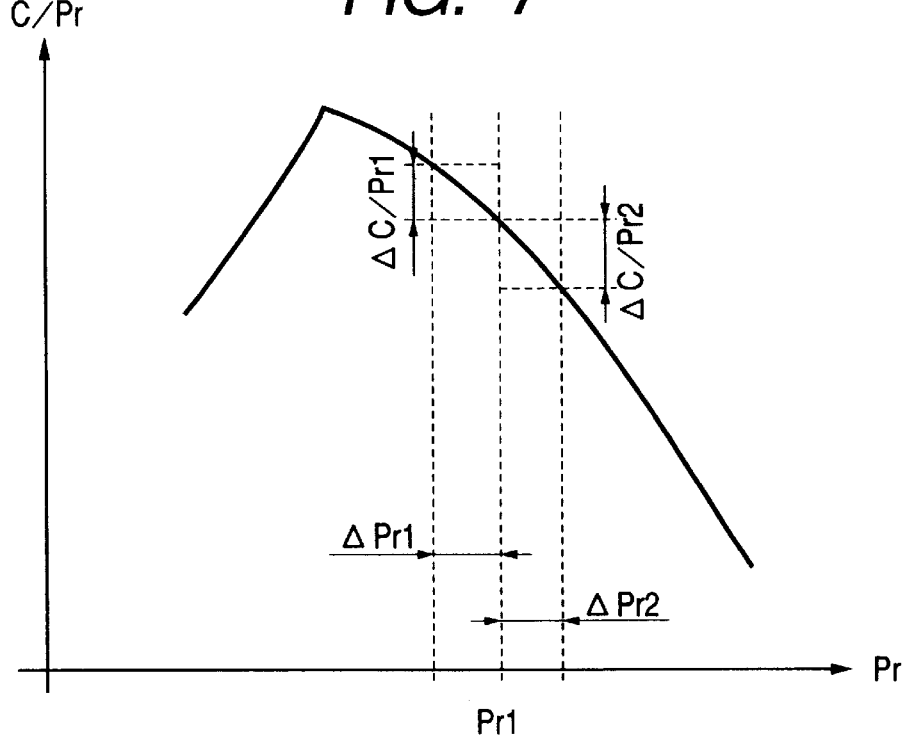
FIG. 7 is a graph showing the relationship between the reproducing power level and the signal level in reproducing power control in the embodiment in FIG. 5.

FIG. 7 is a graph conceptually showing the relationship between the reproducing power and the reproduction signal level. The abscissa represents the reproducing power; and the ordinate, the carrier level normalized with the reproducing power. As shown in FIG. 7, when the signal level normalized with the reproducing power increases by ΔC/Pr, the reproducing power Pr1 increases by ΔPr1. When the signal level decreases by ΔC/Pr2, the reproducing power Pr1 decreases by ΔPr2. With this control, the carrier level normalized with the reproducing power can be kept constant.

In this embodiment, since the reproducing power of the semiconductor laser 1 is changed when the difference between the magneto-optical signal level and the reference signal exceeds a predetermined level, actual switching of reproducing powers is performed in accordance with switching of sectors of the medium 5. According to an experiment conducted by the present inventor, when Pr1≈1.8 mW was set in setting a reproducing power, ΔPr1 and ΔPr2 corresponded to outputs from the objective lens 4 and were given by ΔPr1≈ΔPr2≈0.05 to 0.1 mW with respect to about 10% of ΔC/Pr1 and ΔC/Pr2. Since ΔPr1 and ΔPr2 are very small as compared with Pr1, ΔC/Pr1 and ΔC/Pr2 are equal to signal changes monitored by the reproducing circuit 15. A criterion for determining whether the signal level normalized with a reproducing power changes or not is set to 10% as a signal change monitored by the reproducing circuit 15. That is, when the magneto-optical signal from the reproducing circuit 15 changed by 10% with respect to the reference signal from the reference signal generator 18, the reference signal Vm from the reference signal generator 11 is changed by ΔVm. This made it possible to keep changes in α/T within almost 1% or less.

In the above embodiment, as a main factor that requires switching of outputs of the semiconductor laser 1, a change in ambient temperature is presented. However, the present invention can cope with a change in reproducing power when the objective lens 4 moves in the radial direction of a recording medium as the medium is decentered or access is made near the current reproducing position.

As has been described above, according to the present invention, a reproducing power is controlled such that the level of a reproduction signal reproduced from a recording medium, which is normalized with the reproducing power of the light source is kept constant. Even if, therefore, a super resolution reproducing/recording medium is used, a reproducing power can be accurately set. In addition, a reproducing power can be quickly and effectively set without any loss of the capacity of the recording medium.

What is claimed is:

1. An optical information reproducing apparatus for reproducing information by irradiating a recording medium with a reproducing light beam, comprising:

a light source for generating the reproducing light beam;

a reproducing circuit for reproducing a reproduction signal by using the light beam; and an adjusting circuit for adjusting the light beam power, wherein said adjusting circuit adjusts the light beam power to a value larger than the light beam power at which a value obtained by normalizing the reproduction signal with the light beam power is maximized, such that said adjusting circuit adjusts the light beam power to satisfy $$1.1 \times Pm < Pr < 1.6 \times Pm$$

where Pr is a light beam power to be set, and Pm is a light beam at which the normalized value is maximized.

2. An apparatus according to claim 1, wherein said adjusting circuit adjusts the light beam power to keep the normalized value substantially constant.

3. An apparatus according to claim 2, wherein said adjusting circuit increases the light beam power as a level of the reproduction signal increases, and decreases the light beam power as the level of the reproduction signal decreases.

4. An apparatus according to claim 1, wherein the recording medium is a domain wall displacement type medium.

5. An optical information reproducing method of reproducing information by irradiating a recording medium with a reproducing light beam, comprising the steps of:

reproducing a reproduction signal by using the light beam; and adjusting the light beam power to a value larger than the light beam power at which a value obtained by normalizing the reproduction signal with the beam power is maximized, wherein, in said step of adjusting, the light beam power is adjusted to satisfy $$1.1 \times Pm < Pr < 1.6 \times Pm$$

where Pr is a light beam power to be set, and Pm is a light beam at which the normalized value is maximized.

6. A method according to claim 5, further comprising the step of adjusting the light beam power to keep the normalized value substantially constant.

* * * * *